(12) United States Patent
Herko et al.

(10) Patent No.: US 7,677,848 B2
(45) Date of Patent: Mar. 16, 2010

(54) FLEXIBLE BELT HAVING A PLANED SEAM AND PROCESSES FOR MAKING THE SAME

(75) Inventors: Jonathan H. Herko, Walworth, NY (US); Michael S. Roetker, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 299 days.

(21) Appl. No.: 11/716,089

(22) Filed: Mar. 9, 2007

(65) Prior Publication Data

US 2008/0216629 A1    Sep. 11, 2008

(51) Int. Cl.
*B23D 1/08*      (2006.01)
*B23D 81/00*     (2006.01)

(52) U.S. Cl. .................. 409/293; 409/300; 409/310; 409/313; 156/137; 156/73.4

(58) Field of Classification Search ............. 409/293, 409/297, 298, 300, 308, 310, 313, 315–316, 409/317, 345; 156/73.4, 137, 203, 304.1, 156/304.6
See application file for complete search history.

(56) References Cited

U.S. PATENT DOCUMENTS

| | | | |
|---|---|---|---|
| 4,786,570 A | 11/1988 | Yu et al. | |
| 4,883,742 A * | 11/1989 | Wallbillitch et al. | 430/275.1 |
| 4,937,117 A | 6/1990 | Yu | |
| 5,021,309 A | 6/1991 | Yu | |
| 5,176,478 A | 1/1993 | Munch | |
| 5,273,799 A | 12/1993 | Yu et al. | |
| 5,487,707 A | 1/1996 | Sharf et al. | |
| 5,552,005 A | 9/1996 | Mammino et al. | |
| 6,318,223 B1 | 11/2001 | Yu et al. | |
| 6,440,515 B1 | 8/2002 | Thornton et al. | |
| 6,473,952 B1 * | 11/2002 | Gedrich et al. | 409/300 |
| 7,410,548 B2 * | 8/2008 | Darcy et al. | 156/73.4 |
| 7,531,283 B2 * | 5/2009 | Darcy et al. | 430/127 |
| 2003/0222078 A1 * | 12/2003 | Yu | 219/619 |
| 2005/0081391 A1 * | 4/2005 | Denker | 30/478 |

FOREIGN PATENT DOCUMENTS

| | | |
|---|---|---|
| EP | 1 367 450 A2 | 12/2003 |
| JP | 01093775 | 4/1989 |
| JP | 2003118002 | 4/2003 |

OTHER PUBLICATIONS

U.S. Appl. No. 11/155,672, filed Jun. 20, 2005, John J. Darcy, III.
U.S. Appl. No. 11/211,752, filed Aug. 26, 2005, John J. Darcy, III.
European Search Report for EP Application No. EP 08 10 1990 dated May 23, 2008, 9 pages.

* cited by examiner

*Primary Examiner*—Erica E Cadugan
(74) *Attorney, Agent, or Firm*—Pillsbury Winthrop Shaw Pittman LLP

(57) ABSTRACT

A post treatment process of a seamed belt for providing a smooth surface and substantially eliminating protrusions by using a planing blade, and a seamed belt that has undergone the post treatment.

17 Claims, 6 Drawing Sheets

FLEXIBLE BELT HAVING A PLANED SEAM AND PROCESSES FOR MAKING THE SAME

BACKGROUND

The present embodiments relate generally to a seamed belt with a planed seam, and a process for making the same. More specifically, embodiments relate to a process for smoothing an ultrasonically welded overlap seam of an intermediate transfer belt.

Electrophotographic printing is a well-known and commonly used method of copying or printing documents. Electrophotographic printing is performed by exposing a light image representation of a desired document onto a substantially uniformly charged photoreceptor. In response to that light image the photoreceptor discharges, creating an electrostatic latent image of the desired document on the photoreceptor's surface. Toner is then deposited onto that latent image, forming a toner image. The toner image is then transferred from the photoreceptor onto a receiving substrate such as a sheet of paper. The transferred toner image is then fused with the substrate, usually using heat and/or pressure. The surface of the photoreceptor is then cleaned of residual developing material and recharged in preparation for the production of another image.

The foregoing generally describes black and white electrophotographic printing machines. Electrophotographic printing can also produce color images by repeating the above process for each color of toner that is used to make the color image. For example, the photoreceptive surface may be exposed to a light image that represents a first color, say black. The resultant electrostatic latent image can then be developed with black toner particles to produce a black toner layer that is subsequently transferred onto a receiving substrate. The process can then be repeated or a second color, say yellow, then for a third color, say magenta, and finally for a fourth color, say cyan. When the toner layers are placed in superimposed registration the desired composite color toner image is formed and fused on the receiving substrate.

The color printing process described above superimposes the color toner layers directly onto a substrate. Other electrophotographic printing systems use intermediate transfer belts. In such systems successive toner layers are electrostatically transferred in superimposed registration from the photoreceptor onto an intermediate transfer belt. Only after the composite toner image is formed on the intermediate transfer belt is that image transferred and fused onto the substrate. Indeed, some electrophotographic printing systems use multiple intermediate transfer belts, transferring toner to and from belts as required to fulfill the requirements of the machine's overall architecture.

In operation, an intermediate transfer belt is brought into contact with a toner image-bearing member such as a photoreceptor belt. In the contact zone an electrostatic field generating device such as a corotron, a bias transfer roller, a bias blade, or the like creates electrostatic fields that transfer toner onto the intermediate transfer belt. Subsequently, the intermediate transfer belt is brought into contact with a receiver. A similar electrostatic field generating device then transfers toner from the intermediate transfer belt to the receiver. Depending on the system, a receiver can be another intermediate transfer member or a substrate onto which the toner will eventually be fixed. In either case the control of the electrostatic fields in and near the transfer zone is a significant factor in toner transfer.

Intermediate transfer belts often take the form of seamed belts fabricated by fastening two ends of a web material together, such as by welding, sewing, wiring, stapling, or gluing. While seamless intermediate transfer belts are possible, they require manufacturing processes that make them much more expensive than similar seamed intermediate transfer belts. This is particularly true when the intermediate transfer belt is long.

Seamed belts are fabricated from a sheet cut from an imaging member web. The sheets are generally rectangular or in the shape of a parallelogram where the seam does not form a right angle to the parallel sides of the sheet. All edges may be of the same length or one pair of parallel edges may be longer than the other pair of parallel edges. The sheets are formed into a belt by joining overlapping opposite marginal end regions of the sheet. A seam is typically produced in the overlapping marginal end regions at the point of joining. Joining may be effected by any suitable means. Typical joining techniques include welding (including ultrasonic), gluing, taping, pressure heat fusing, and the like. For example, puzzle-cut seams are disclosed in U.S. Pat. Nos. 5,487,707, 6,318,223, and 6,440,515, which are hereby incorporated by reference in their entirety. Ultrasonic welding is generally the preferred method of joining because it is rapid, clean (no solvents) and produces a thin and narrow seam. In addition, ultrasonic welding is preferred because the mechanical pounding of the welding horn causes generation of heat at the contiguous overlapping end marginal regions of the sheet to maximize melting of one or more layers therein. A typical ultrasonic welding process is carried out by holding down the overlapped ends of a flexible imaging member sheet with vacuum against a flat anvil surface and guiding the flat end of an ultrasonic vibrating horn transversely across the width of the sheet, over and along the length of the overlapped ends, to form a welded seam.

Belts, sheets, films and the like are important to the xerographic process. Belt function is often significantly affected by the seam of the belt. For example, belts formed according to known butting or overlapping techniques provide a bump or other discontinuity in the belt surface leading to a height differential between adjacent portions of the belt, for example, of 0.010 inches or more depending on the belt thickness. This increased height differential leads to performance failure in many applications.

When ultrasonically welded into a belt, the seam of multilayered electrophotographic imaging flexible member belts may occasionally contain undesirable high protrusions such as peaks, ridges, spikes, and mounds. These seam protrusions present problems during image cycling of the belt machine because they interact with cleaning blades to cause blade wear and tear, which ultimately affect cleaning blade efficiency and service life.

A bump, surface irregularity, or other discontinuity in the seam of the belt may disturb the tuck of the cleaning blade as it makes intimate contact with the photoconductive member surface to effect residual toner and debris removal. The increased height differential may allow toner to pass under the cleaning blade and not be cleaned. Furthermore, seams having differential heights may, when subjected to repeated striking by cleaning blades, cause photoconductive member cycling speed disturbance which affects the crucial photoconductive belt motion quality. Moreover, seams with a bump or any morphological defects can cause the untransferred, residual toner to be trapped in the sites of seam surface irregularities. The seam of a photoreceptor belt which is repeatedly subjected to the striking action by a cleaning blade under machine functioning conditions has triggered the development of pre-mature seam delamination failure. In addition, the discontinuity in belt thickness due to the presence of an excessive seam height yields variances of mechanical strength in the belt as well as reducing the fatigue flex life of the seam when cycling over the belt module support rollers. As a result, both the cleaning life of the blade and the overall service life of the photoreceptor belt can be greatly diminished.

Moreover, the protrusion high spots in the seam may also interfere with the operation of subsystems of copiers, printers and duplicators by damaging electrode wires used in development subsystems that position the wires parallel to and closely spaced from the outer imaging surface of belt photoreceptors. These closely spaced wires are employed to facilitate the formation of a toner powder cloud at a development zone adjacent to a toner donor roll and the imaging surface of the belt imaging member.

In addition, the copy quality of image printout can be degraded. Such irregularities in seam height provide vibrational noise in xerographic development which disturb the toner image on the belt and degrade resolution and transfer of the toner image to the final copy sheet. This is particularly prevalent in those applications requiring the application of multiple color layers of liquid or dry developer on a photoreceptor belt, which are subsequently transferred to a final copy sheet. Further, the seam discontinuity or bump in such a belt may result in inaccurate image registration during development, inaccurate belt tracking and overall deterioration of motion quality, as a result of the translating vibrations.

As such, there is a need for providing a seamed belt with an improved seam surface topology such that it can withstand greater dynamic fatigue conditions. For example, an improved belt having a seam which provides a smoother surface with substantially decreased or eliminated profile protrusions or irregularity would extend service life. In addition, there is a need for a process for efficiently and consistently smoothing the welded seam of such flexible belts to achieve smooth seams.

SUMMARY

According to embodiments illustrated herein, there is provided a flexible belt that has an improved surface topology of its welded overlap seam, and processes for making such flexible belts.

In particular, an embodiment provides an process for post treatment of a seamed belt. The process includes providing a seamed belt having a seam extending from one parallel edge to the other parallel edge, the seam having a seam region comprising an overlap of two opposite edges, positioning the seamed belt on a round anvil such that an edge of the seam region lies on an apex of the round anvil, contacting the edge of the seam region with a planing blade such that the planing blade is elevated with respect to the edge of the seam, and removing material from the edge of the seam region with a continuous cut, wherein the resulting flexible belt has a smooth welded seam.

Embodiments also provide an electrographic image development device, comprising at least one seamed flexible belt formed by a process for post treatment of a seamed belt comprising providing a seamed belt having a seam extending from one parallel edge to the other parallel edge, the seam having a seam region comprising an overlap of two opposite edges, positioning the seamed belt on a round anvil such that an edge of the seam region lies on an apex of the round anvil, contacting the edge of the seam region with a planing blade such that the planing blade is elevated with respect to the edge of the seam, and removing material from the edge of the seam region with a continuous cut, wherein the resulting flexible belt has a smooth welded seam.

Further embodiments provide a process for post treatment of an ultrasonically welded seamed belt comprising providing a seamed belt having a welded seam extending from one parallel edge to the other parallel edge, the welded seam having a seam region comprising an overlap of two opposite edges, positioning the seamed belt on a round anvil such that an edge of the seam region lies on an apex of the anvil, contacting the edge of the seam region with a planing blade such that the planing blade is elevated to form an angle of from about 15 degrees to about 45 degrees with respect to a plane of the welded seam, and removing material from the edge of the seam region with a continuous cut, wherein the resulting seamed belt has a smooth welded seam.

BRIEF DESCRIPTION OF THE DRAWINGS

For a better understanding of the present embodiments, reference may be had to the accompanying figures.

DETAILED DESCRIPTION

In the following description, it is understood that other embodiments may be utilized and structural and operational changes may be made without departure from the scope of the present embodiments disclosed herein.

The present embodiments relate to a seamed flexible belt with a planed seam such that the welded seam has a smoother surface topology to greatly improve both the cleaning life of the cleaning blade and the overall service life of the flexible belt. More specifically, embodiments relate to a post treatment process for smoothing an ultrasonically welded overlap seam of a flexible belt.

Typical electrostatographic flexible belt imaging members include, for example, photoreceptors for electrophotographic imaging systems, electroreceptors such as ionographic imaging members for electrographic imaging systems, and intermediate image transfer belts for transferring toner images in electrophotographic and electrographic imaging systems. Those the present embodiments can be used with fuser belts, pressure belts, intermediate transfer belts, transfuse belts, transport belts, developer belts, photoreceptor belts, and the like. The seamed belts are prepared using a process which forms a strength enhancing bond between voids of mutually mating elements. The strength enhancing bond comprises a material which is chemically and physically compatible with the material of the coating layers of the belt.

Figure 1:
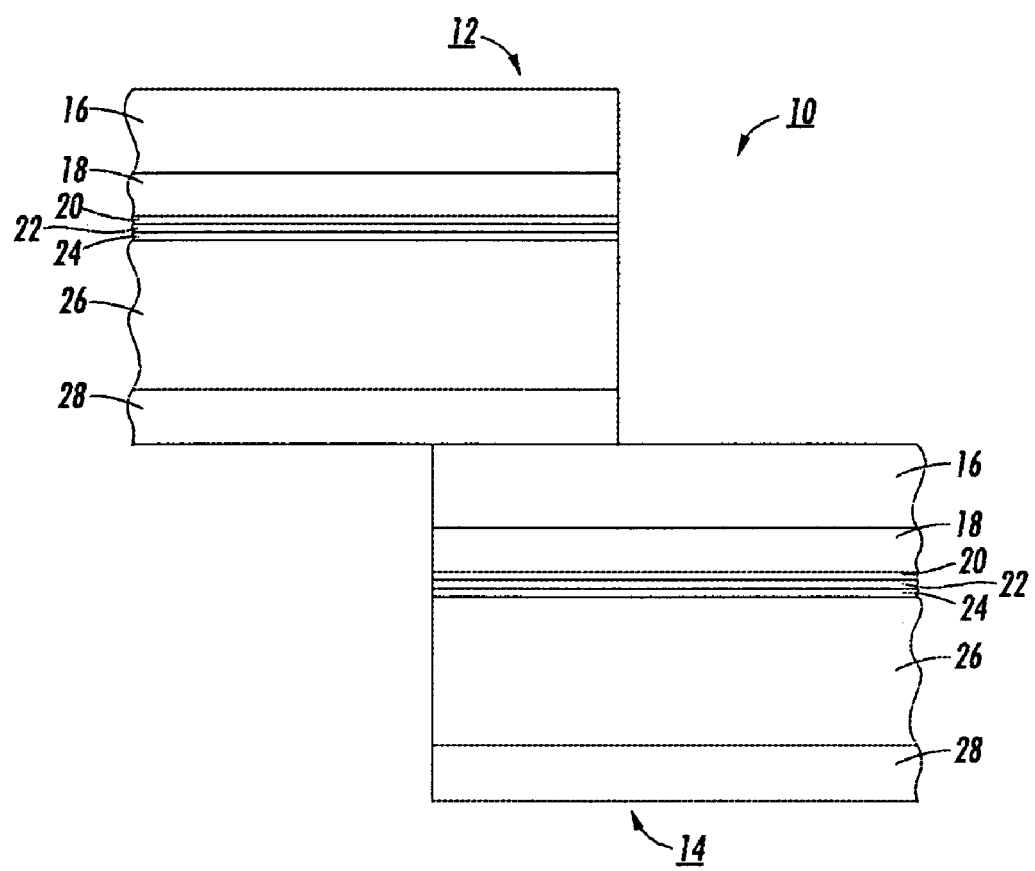
FIG. 1 is a cross-sectional view of a multilayered flexible sheet of imaging material with opposite ends overlapped.

Referring to FIG. 1, there is illustrated a flexible member 10 in the form of a sheet having a first end marginal region 12 overlapping a second end marginal region 14 to form an overlap region ready for a seam forming operation. The flexible member 10 can be utilized within an electrophotographic imaging device and may be a single film substrate member or a member having a film substrate layer combined with one or more additional coating layers. At least one of the coating layers comprises a film forming binder.

The flexible member 10 may be a single layer or comprise multiple layers. If the flexible member 10 is to be a negatively charged photoreceptor device, the flexible member 10 may comprise a charge generator layer sandwiched between a conductive surface and a charge transport layer. Alternatively, if the flexible member 10 is to be a positively charged photoreceptor device, the flexible member 10 may comprise a charge transport layer sandwiched between a conductive surface and a charge generator layer.

The layers of the flexible member 10 can comprise numerous suitable materials having suitable mechanical properties. Examples of typical layers are described in U.S. Pat. No. 4,786,570, U.S. Pat. No. 4,937,117 and U.S. Pat. No. 5,021,309, the entire disclosures thereof being incorporated herein by reference. The flexible member 10 shown in FIG. 1, including each end marginal region 12 and 14, comprises from top to bottom a charge transport layer 16 (e.g., 24 micrometers thick), a generator layer 18 (e.g., 1 micrometer thick), an interface layer 20 (e.g., 0.05 micrometer thick), a blocking layer 22 (e.g., 0.04 micrometer thick), a conductive ground plane layer 24 (e.g., 0.02 micrometer thick, a supporting layer 26 (e.g., 76.2 micrometer thick), and an anti-curl back coating layer 28 (e.g., 14 micrometer thick). It should be understood that the thickness of the layers are for purposes of illustration only and that a wide range of thicknesses can be used for each of the layers.

Figure 2:
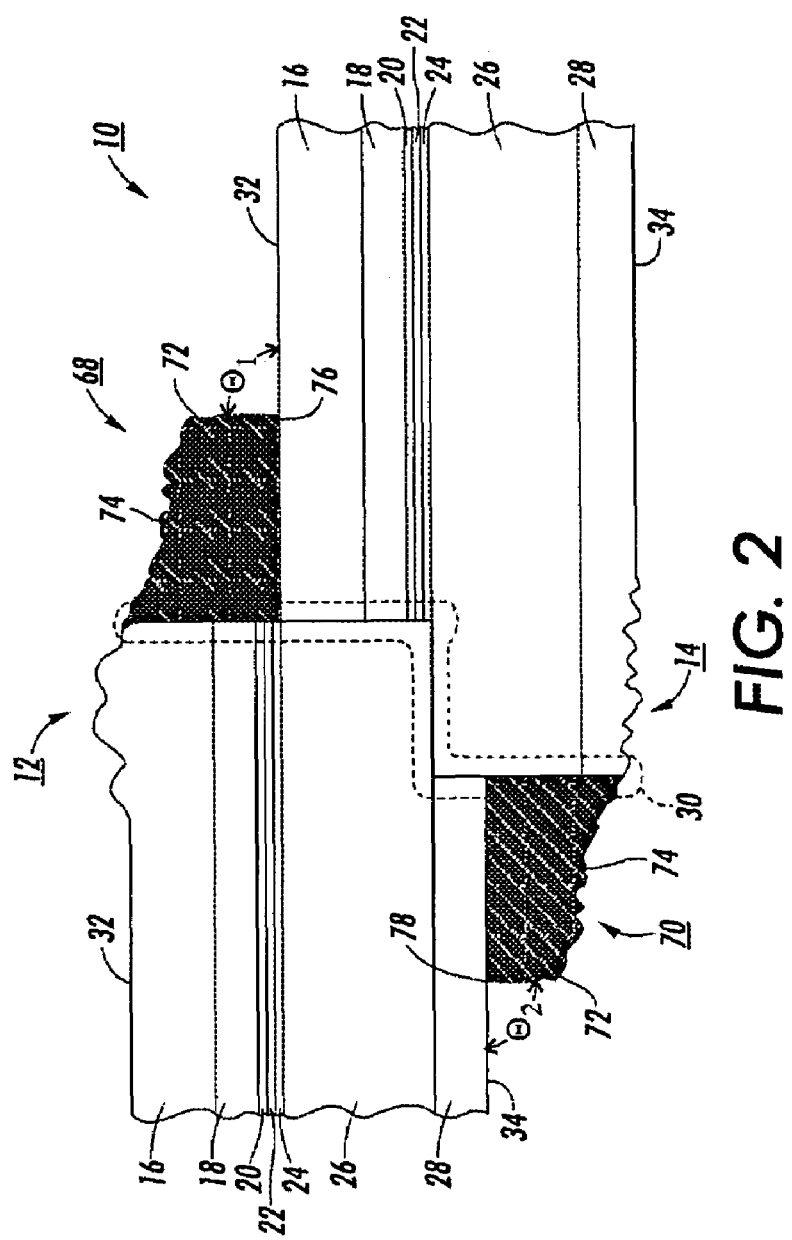
FIG. 2 is a cross-sectional view of a multilayered seamed belt derived from the sheet of FIG. 1 after ultrasonic seaming welding.

The end marginal regions 12 and 14 can be joined by any suitable means including gluing, taping, stapling, pressure and heat fusing to form a continuous member such as a belt, sleeve, or cylinder. Preferably, both heat and pressure are used to bond the end marginal regions 12 and 14 into a seam 30 in the overlap region as illustrated in FIG. 2. The flexible member 10 is thus transformed from a sheet of electrophotographic imaging material as illustrated in FIG. 1 into a continuous electrophotographic imaging belt as illustrated in FIG. 2. The flexible member 10 has a first exterior major surface or side 32 and a second exterior major surface or side 34 on the opposite side. The seam 30 joins the flexible member 10 so that the bottom surface 34 (generally including at least one layer immediately above) at and/or near the first end marginal region 12 is integral with the top surface 32 (generally including at east one layer immediately below) at and/or near the second end marginal region 14.

A preferred heat and pressure joining means includes ultrasonic welding to transform the sheet of photoconductive imaging material into a photoreceptor belt. The belt can be fabricated by ultrasonic welding of the overlapped opposite end regions of a sheet. In the ultrasonic seam welding process, ultrasonic energy applied to the overlap region is used to melt suitable layers such as the charge transport layer 16, generator layer 18, interface layer 20, blocking layer 22, part of the support layer 26 and/or anti-curl back coating layer 28. Direct fusing of the support layer achieves optimum seam strength.

Because an overlap seam, for example an ultrasonically welded seam, of a flexible belt often has an irregular surface topology, it is difficult for the cleaner blade to clean toner around the seam. This profile can also cause damage to the cleaner blades by nicking the cleaning edge of the blade. The toner trapping from the poor cleaning and the blade damage results in streaking from the seam and creates an image quality problem. A few manners of addressing these problems are disclosed in U.S. application Ser. No. 11/211,752, now U.S. Pat. No. 7,410,548, filed Aug. 26, 2005, and U.S. application Ser. No. 11/155,672, now U.S. Pat. No. 7,531,283, filed Jun. 20, 2005, which are hereby incorporated by reference in their entirety.

Figure 3A:
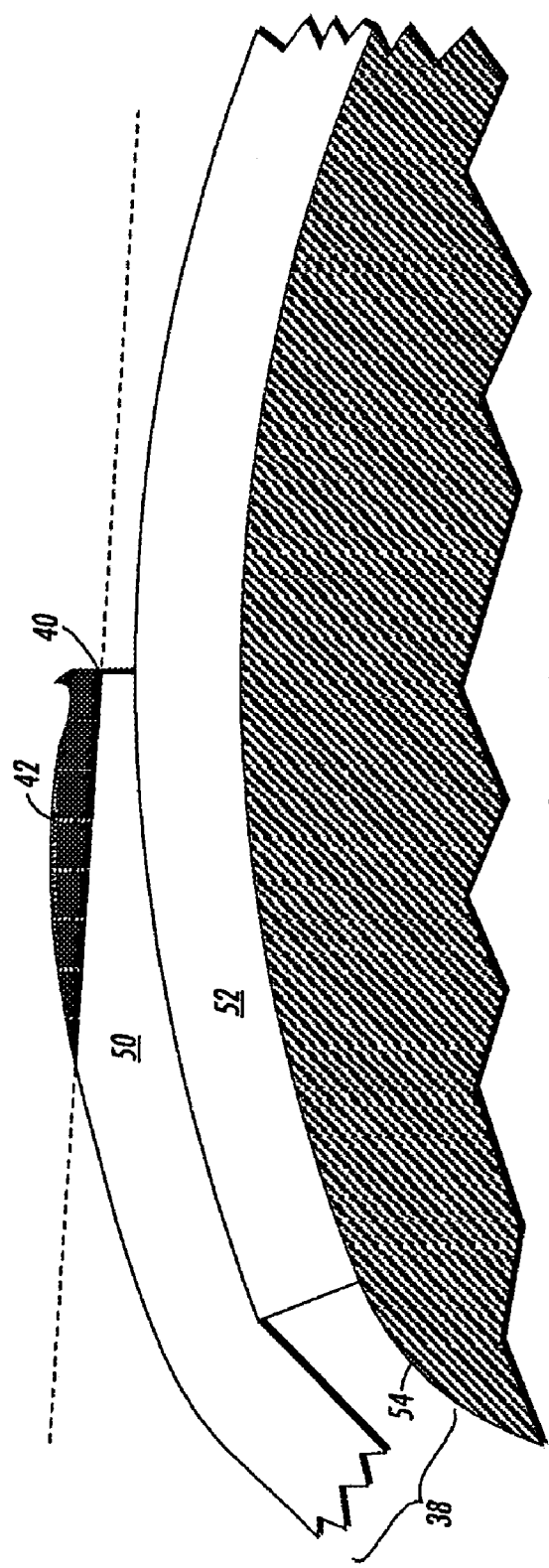
FIG. 3A is a cross-sectional view of a seamed belt to be planed according to embodiments of the present disclosure.
Figure 3B:
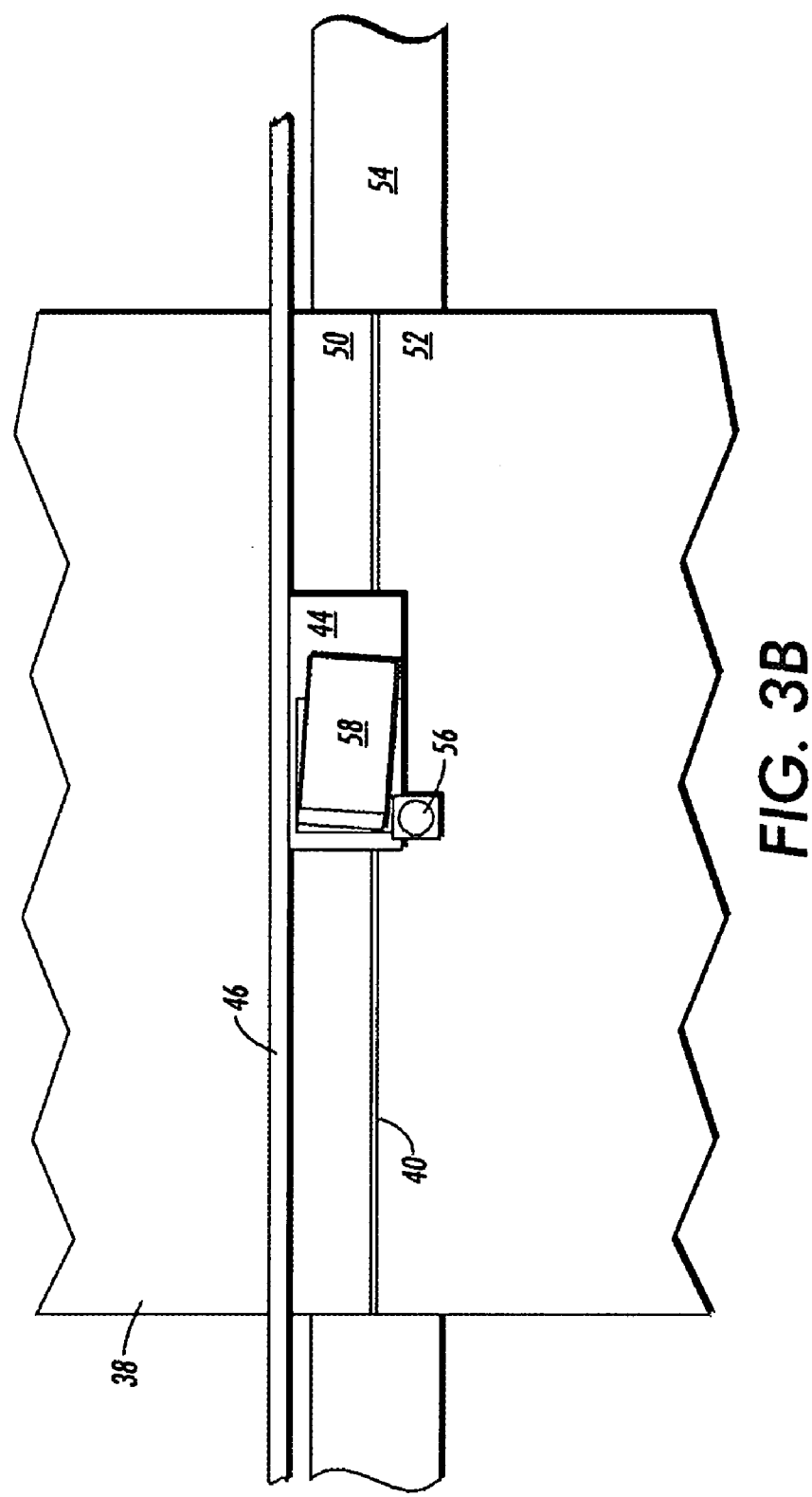
FIG. 3B is a top view of a seamed belt being planed according to embodiments of the present disclosure.

As shown in FIGS. 3A and 3B, a seamed belt 38 has an overlap seam 40 comprising an overlap layer 50 and an underlap layer 52. The seam 40 has an irregular surface topology. As discussed above, the irregular peaks and protrusions cause numerous problems in machine operation. To smooth out and significantly remove the undesired roughness of the overlap seam 40, the present embodiments remove the undesired protruding material 42 using a low angle block plane 44 to cut away the protrusions 42 that make the surface irregular. In embodiments, the plane 44 can be mounted on a linear slide 46. In further embodiments, this slide is an automated linear slide 46. The belt 38 is held in place by vacuum on an anvil 54. In specific embodiments, the anvil 54 is round in shape, and comprises a rigid, supportive material. As the plane 44 traverses along the length of the seam 40, removing the rough protrusions 42 of the seam 40, the surface profile at the overlap layer 50 is smoothed. A vacuum attachment 56 with an intake or waste collection container may be used to ride directly over the plane 44 to collect the waste as it is generated.

To cut or plane the seam 40 effectively, the positioning of the blade 58 (of the plane) to the seam 40 is critical. To be most effective, the edge of the seam overlap 50 should be positioned on the apex of the anvil 54 to fully expose the area to be trimmed. The amount of material 42 removed is a function of this exposure based on the anvil diameter and the penetration depth of the planing blade 58. The planing blade 58 should be elevated. In embodiments, the planing blade 58 is elevated to form an angle of about 5 degrees with respect to the length of the anvil and skewed to form an angle of from about 5 to about 35 degrees with respect to the seam. In further embodiments, the blade cutting edge should be elevated to form an angle of from about 15 degrees to about 45 degrees with respect to the seam 40, cutting away from the overlap 50. Because material is removed in one continuous cut, waste is much easier to collect than in other methods, limiting contamination of the process equipment. The vacuum attachment 56 collects the waste material 42 as it is being removed by the planing blade 58. The seam profile, as shown in FIGS. 4 and 5, demonstrates a comparison of the welded seam before and after the post treatment process.

Figure 4:
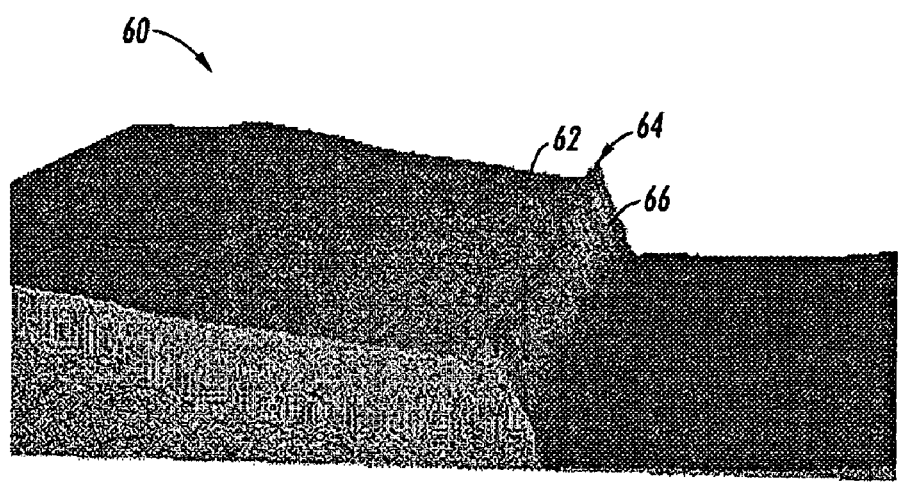
FIG. 4 is an enlargement of an ultrasonically welded seam of a seamed belt prior to being planed.
Figure 5:
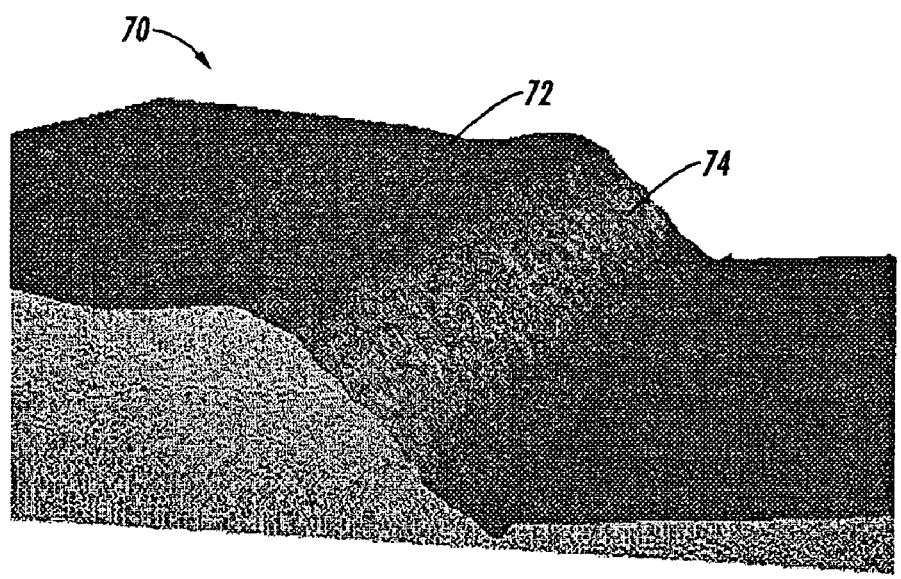
FIG. 5 is an enlargement of an ultrasonically welded seam of a seamed belt after being planed according to embodiments of the present disclosure.
Figure 6A:
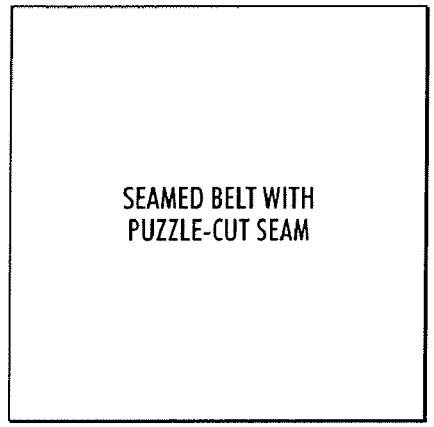
FIG. 6A is a schematic representation of a seamed belt with a puzzle-cut seam.
Figure 6B:
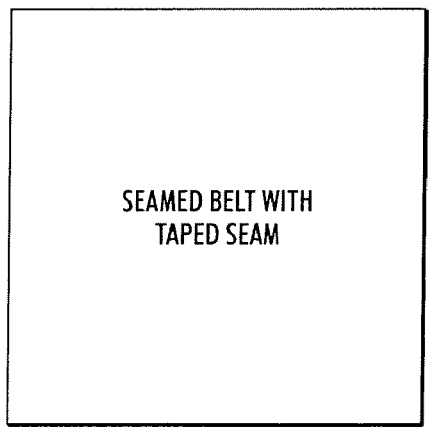
FIG. 6B is a schematic representation of a seamed belt with a taped seam.

In FIG. 4, the depicted seamed belt 60 has not been planed. As can be clearly seen from the three-dimensional topographical image, the overlap 62 has an irregular surface topology with sharp protrusions 64 at the seam 66. FIG. 5 is another depicts a seamed belt 70 that has been post-treated with the smoothing process according to the present embodiments. As can be seen from this three-dimensional topographical image, the overlap 72 has been smoothed out and any sharp protrusions at the seam 74 have been substantially eliminated. Among other benefits, the planed welded seam reduces cleaning blade damage and image streaking.

In specific embodiments, post treatment process is implemented by an automated system to plane the seamed belts. In such embodiments, an automated low-angle block plane is affixed to a linear actuator, which drives the plane tangent to the roller's apex along its length. A foot attached to the blade, which rides on the underlap side of the seam, can be used to adjust the blades movement as necessary.

The present embodiments may be used on welded seams (including ultrasonically welded seams), puzzle-cut seams and taped seams and are applicable across all machine platforms whether xerographic systems utilizing tandem or belt designs. The embodiments may also be applied to seams in various seamed belt members, such as for example, a photoreceptor, an electroreceptor, an intermediate image transfer belt, and the like.

Furthermore, the present methods, when refined, can provide for planed seams that will aid in the production of imagable seam belts.

While the description above refers to particular embodiments, it will be understood that many modifications may be made without departing from the spirit thereof. The accompanying claims are intended to cover such modifications as would fall within the true scope and spirit of embodiments herein.

The presently disclosed embodiments are, therefore, to be considered in all respects as illustrative and not restrictive, the scope of embodiments being indicated by the appended claims rather than the foregoing description. All changes that come within the meaning of and range of equivalency of the claims are intended to be embraced therein.

All the patents and applications referred to herein are hereby specifically, and totally incorporated herein by reference in their entirety in the instant specification.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

What is claimed is:

1. A process for post treatment of a seamed belt (38) comprising:
    providing a seamed belt comprising a member having a seam extending from one parallel edge to the other parallel edge of the member, the seam having a seam region comprising an overlap of two opposite ends of the member, the ends thus forming an overlap layer and an underlap layer;
    positioning the seamed belt on a round anvil such that an edge of the seam region lies on an apex of the round anvil;
    contacting the edge of the seam region with a planing blade such that the planing blade is elevated with respect to an exposed surface of the underlap layer proximate the edge of the seam; and
    removing material from the edge of the seam region with a continuous cut, wherein the resulting flexible belt has a smooth seam.

2. The process of claim 1, wherein the seam is selected from the group consisting of a welded seam, an ultrasonically welded seam, a puzzle-cut seam and a taped seam.

3. The process of claim 1, wherein the seamed belt is selected from the group consisting of a photoreceptor, an electroreceptor, and an intermediate image transfer belt.

4. The process of claim 1 being automated.

5. The process of claim 1, wherein the planing blade is mounted on an automated linear slide.

6. The process of claim 1, wherein an amount of the material to be removed is based on a diameter of the anvil and a penetration depth of the planing blade.

7. The process of claim 1, wherein the seamed belt is held on the anvil by vacuum.

8. The process of claim 1, wherein a vacuum attachment is coupled above the planing blade to collect the material being removed.

9. The process of claim 1, wherein the member consists of a single layer of substantially homogeneous material.

10. The process of claim 1, wherein the member comprises at least two different layers having at least different compositions or different properties.

11. A process for post treatment of an ultrasonically welded seamed belt comprising:
    providing a seamed belt comprising a member having a welded seam extending from one parallel edge to the other parallel edge of the member, the welded seam having a seam region comprising an overlap of two opposite ends of the member, the ends thus forming an overlap layer and an underlap layer;
    positioning the seamed belt on a round anvil such that an edge of the seam region lies on an apex of the anvil;
    contacting the edge of the seam region with a planing blade such that the planing blade is elevated with respect to an exposed surface of the underlap layer proximate the edge of the seam region; and
    removing material from the edge of the seam region with a continuous cut, wherein the resulting seamed belt has a smooth welded seam.

12. The process of claim 11, wherein the seamed belt is selected from the group consisting of a photoreceptor, an electroreceptor, and an intermediate image transfer belt.

13. The process of claim 11 being automated.

14. The process of claim 11, wherein the planing blade is mounted on an automated linear slide.

15. The process of claim 11, wherein an amount of material to be removed is based on a diameter of the anvil and a penetration depth of the planing blade.

16. The process of claim 11, wherein the flexible belt is held on the anvil by vacuum.

17. The process of claim 11, wherein a vacuum attachment is coupled above the planing blade to collect the material being removed.

* * * * *